April 15, 1958

C. H. GRAY 2,830,760

COMPUTING DEVICE

Filed Oct. 29, 1953

INVENTOR.
Clifford Harold Gray
BY Michael S. Striker
Attorney

United States Patent Office 2,830,760
Patented Apr. 15, 1958

2,830,760

COMPUTING DEVICE

Clifford Harold Gray, North Sydney, New South Wales, Australia

Application October 29, 1953, Serial No. 388,979

18 Claims. (Cl. 235—64.7)

This invention relates to exposure meters and to other industrial devices, operations and problems for use where more than two relating and necessary factors can be represented by numerical values, each of which factors having an effective control in determining the final factor also represented by a numerical value, and for the rapid determination of an unknown numerical value of one co-ordinating factor or a set of unknown numerical values of co-ordinating factors; in particular, the invention relates to improvements in methods and means for pre-determining camera exposures in relation to light-sensitive materials, and has been devised to pre-determine such exposures for a variety of situations and conditions constituting the factors which have effective control in determining the said exposures, and is applicable to photography where the light-sensitive material is a film emulsion and to television where the light-sensitive material is a photo-electric cell or the like.

Some objects of the invention, as applied to camera exposure determinations, are, to provide methods and means whereby the various measurements of different actinic strengths of the lighting conditions, sensitivities of light-sensitive materials, and the camera exposure settings, may be co-ordinated, combined, and indicated by the manual manipulations of scales, charts, graphs, or other representations of any selected unit scale, metric or otherwise; to provide methods and means whereby earlier made combinations and adjustments relating to the above stated measurements may be referenced and indicated to camera exposures applicable to these earlier conditions; and to provide means whereby the indicators in their adjusted positions may be locked therein by simple manually operable means.

In the accompanying drawings which illustrate one form of means for effectively operating the inventon in its application to artificial-light photography:

Figure 1:
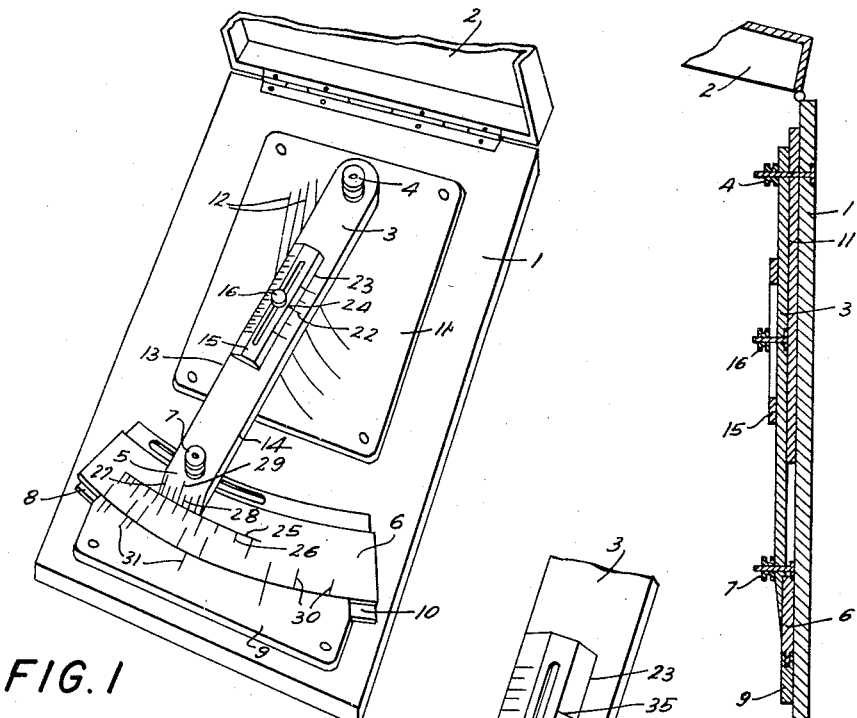
Fig. 1 is a part-perspective and part-plan view of a base plate and its adjuncts.
Figure 2:
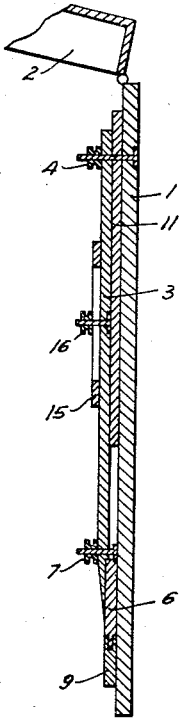
Fig. 2 is a central longitudinal section of the same.

My device consists of a base plate 1 of any convenient size and material, fitted, if so desired, with a cover 2 pivoted near one of its ends, a chart 11 adapted to be detachably fixed to plate 1, a laterally swingable arm 3 provided with manually adjustable locking means such as a screw 4 for locking arm 3 in any desired position with respect to plate 1 and chart 11. On the free end 5 of arm 3 is mounted a manually movable part-annular member 6 that is adapted to be locked by suitable means 7 in its adjusted position in relation to arm 3, so that arm 3 and member 6 may be moved together. The lower edge 8 of member 6 is formed as an arc beneath which is a rigid member 9 that has its upper edge 10 formed as an arc or guide on which the lower edge 8 is positioned to slide.

Plate 1, underneath arm 3 is provided with the chart 11 upon which is any desired number of curved lines or graphs 12 representing the actinic values of various lighting sources, and so placed that the curved lines are intersected by the longitudinal edges 13, 14 of arm 3.

Figure 3:
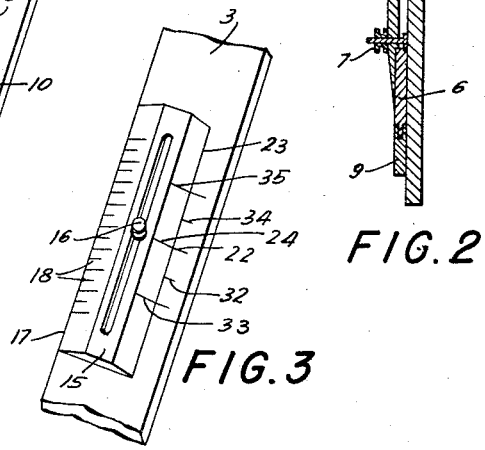
Fig. 3 is an enlarged view of a slidable scale member.
Figure 4:
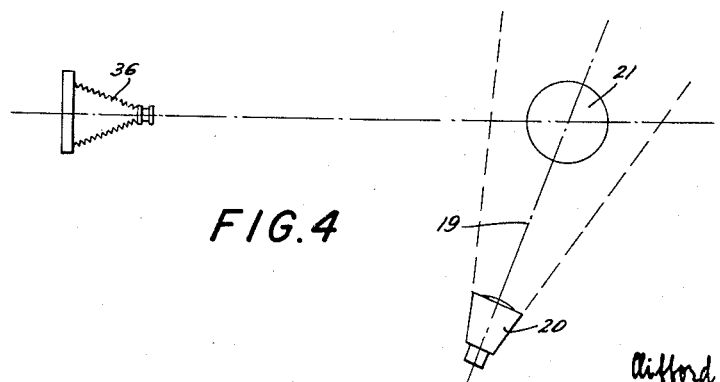
Fig. 4 is a diagrammatic view of a camera, lighting source, and subject of the photograph.

Upon arm 3 is a manually slidable scale member 15 (see Fig. 3) adapted to be moved parallel to the longitudinal axis of arm 3 by means of a concealed tongue and groove or the like. A locking mechanism 16 is provided to prevent accidental dispacement of member 15 in relation to arm 3 during subsequent adjustments of the other members. On the longitudinal edge 17 of member 15 are graduations 18 representing the measured distances between lighting source 20 and the subject 21 of the photograph (see Fig. 4).

The actinic strength of the lighting conditions is indicated by the intersection of the appropriate light source curve 12 representing the actinic value of lighting source 20, with the graduation 18 on member 15 that represents the measured distance 19 between lighting source 20 and the subject 21 of the photograph. Movement of member 15 along arm 3 displaces graduations 18 in relation to an arbitrarily selected curve 12. If the graduations 18 have low values towards the free-end 5 of arm 3 and progressively higher values toward the locking means 4, then movement of member 15 away from end 5 will bring graduations 18, representing smaller distances, adjacent to the selected curve 12 and will represent an increase in the actinic strength of the lighting conditions, while a downward displacement of member 15 will represent a reduction in the actinic strength.

By placing a reference line 22 (see Fig. 3) on arm 3, and graduations 33, 35 on either side of a central graduation 24 on the longitudinal edge 23 of member 15 to co-operate with reference line 22, the graduations 33, 35 may indicate the degree of change in the actinic strength brought about by the displacement of member 15. Having a set of graduations 32, 34 on either side of reference line 22 rather than the single reference line 22, it is possible to use this second set of graduations—32, 34—with the first set of graduations—33, 35—to indicate two sets of corrections and to have the values of each on view for immediate or later use.

The method of operating the corrections is to locate the first correction value on the graduations 33, 35 on member 15, then to displace member 15 until the second correction value on graduations 32, 34 on arm 3 is adjacent to the first correction value. The intersection of the selected curve 12 with the graduation 18, after the two sets of correctons have been applied, will indicate the actinic strength greater or less than that normally used, and the extent of the deviation indicated by the paired values on graduations 33, 35 and graduations 32, 34 respectively.

It is to be understood that the graduations 18 are placed on member 15 to offer a convenient means for introducing corrections to the actinic strength required in certain circumstances. In some applications of the invention these corrections may not be necessary, in which case the graduations 18 may be placed on the longitudinal edge 13 of arm 3.

The arc 25 upon which free end 5 traverses member 6 has graduations 26 to represent the sensitivities of different film emulsions. Free end 5 has graduations 27, 28 on either side of a central pointer line 29. Graduations 27, 28 combine sensitivity graduations 26 on member 6 with the actinic strength of the lighting conditions indicated by the positioning of graduations 18 with the graphs 12 on chart 11. Graduations 27, 28 permit corrections to film sensitivity values for changes in type and method of processing to be applied to the imaged film. Graduations 30, 31 on the arcs on lower edge 8 of member 6 and upper edge 10 of member 9 represent respectively the shutter speeds and the F/ratio values.

The following example gives one method of using the device described above:

Assuming that the subject of the photograph is such that a very short shutter speed is necessary, that the highlight details are to be produced on the photograph, that the film sensitivity is known, and that normal processing is to be adopted with the exposed film, the problem is to find the required f/ratio value for these conditions.

To record highlight details, other things being equal, necessitates the reduction in the actinic strength of the lighting conditions, so member 15 is displaced until the appropriate graduation of the graduations 33, 35 is in alignment with the reference line 22 on arm 3. Member 6 is then moved until the pointer line 29 on arm 3 is adjacent to and in line with the appropriate graduation on scale 26. Arm 3 and member 6 are swung about pivot point 4 until the curve 12 on chart 11 representing the actinic value of the lighting source intersects the line of the graduation 18 which represents the distance between light-source and subject. Adjacent paired values on the arcs on lower edge 8 of member 6 and upper edge 10 of member 9 represent, respectively, the shutter speeds and f/ratio values for these conditions. For the pre-selected shutter speed, the required f/ratio value is found simply by locating the pre-selected shutter speed on scale 30 and then to read off the value adjacent to this on the f/ratio scale 31.

In the application of the invention to artificial light photography, the light-sensitive material is a film emulsion, the sensitivity of which may be measured by a number of units, for example in degrees Scheiner. The quantity of light received by the subject determines the degree of brightness of the subject and the photographic image is obtained by focussing that light on to the film by means of the lens system of a camera. The density of the image is related to the brightness of the subject and is dependent on the actinic value of the lighting sources and the measured distance of the lighting sources from the subject of the photograph.

The proportion of light reaching the emulsion is indicated on the camera by the f/ratio in conjunction with the shutter speed. The f/ratio is the numerical value of the aperture of the lens diaphragm and is the ratio of the focal length of the lens system to the diameter of the aperture. The shutter speed is the time during which the light passes through the aperture to the emulsion and is measured on still cameras in fractions of a second, and on movie cameras by the number of frames to be exposed in one second. Exposure determination is the selection of the paired values—the f/ratio and the shutter speed—which in conjunction will produce a desired uniform image quality on the emulsion. Effective exposure determination should provide these camera exposure settings for variation in the essential factors, which include the actinic values of the lighting sources, the light source-to-subject distances and the sensitivities of the emulsions.

The quantity of light reaching a film emulsion is directly proportional to the shutter speed, say $t$, and the area of the aperture of the lens diaphragm. The f/ratio, say $f$, is the numerical measure of the said aperture and is defined as the ratio of the focal length of the camera lens system to the diameter of the aperture. Since the area of the aperture is directly proportional to the square of its diameter, and since for any selected lens system the diameter is indirectly proportional to $f$, then it follows that the quantity of light reaching the film emulsion is directly proportional to $t/f^2$.

Since an arbitrarily selected film emulsion requires an optimal quantity of light to obtain a satisfactory image quality then for this film emulsion $t/f^2$ must equal a constant value, other things being equal. Because numerous paired values for the $t$ and $f$ satisfy the relationship that $t/f^2$ equals a constant value, then it follows there are numerous exposure settings for any one selected film emulsion.

The determination of these settings may be obtained conveniently by the use of logarithmic scales. By constructing two scales, the first a half-log scale, ½ log $t$, selecting the values for $t$ accepted in the photographic art, and the second a log scale, log $f$, selecting the values for $f$ accepted in the photographic art, and placing one adjacent to the other, the adjacent paired values for $t$ and $f$ satisfy the relation $t/f^2$ is constant. This can be seen from the following statement.

Suppose when $t_1$ is adjacent to $f_1$ that $t_2$ is adjacent to $f_2$. The scaled distance ½ log $t_1$—½ log $t_2$ will be equal to the scaled distance log $f_1$—log $f_2$. Hence log $t_1$—2 log $f_1$ is equal to log $t_2$—2 log $f_2$ or $t_1/f_1^2 = t_2/f_2^2$.

It is important to notice that the actual positioning of these scales relative to one another alters the numerical value of the constant but for any one position of the scales all adjacent paired values on the two scales are such that $t_1/f_1^2 = t_2/f_2^2$.

With the dimensions of the device predetermined the radius of the arc on the lower edge 8 of member 6 and the upper edge 10 of member 9 is calculable. The logarithmic and half-logarithmic values for the selected $f$ and $t$ values to be indicated on the scales are obtained from mathematical tables then proportioned to the dimensions of this arc, and plotted respectively on the upper edge of the fixed member and the lower edge of the longitudinally slidable part-annular member, respectively.

Shift of the shutter speed scale to the right through a distance ½ log $r$ units proportioned to dimensions of the arc described above has the effect of reducing the numerical value indicated prior to the displacement of $t/f^2$ to the numerical value of $t/rf^2$. Similarly shift of the shutter speed scale to the left through a distance ½ log $r$ units has the effect of increasing the numerical value indicated prior to the displacement of $t/f^2$ to the numerical value $rt/f^2$.

Consider the member 6 having a datum line drawn radially to the arc on the lower edge 8 of the member 6 and an external pointer means cooperating with this datum line. Suppose the adjacent paired values on the shutter speed scale and the f/ratio scale specify the value for $t/f^2$ which will produce a satisfactory image upon a particular film emulsion. Suppose the film speed of this film emulsion is indicated at the datum. Film emulsions which are less light-sensitive than the one indicated at the datum can be indicated to the right. Likewise those film emulsions which are more light sensitive can be indicated to the left of the datum. This follows because the displacement of member 6 which brings the external pointer means into alignment with the indicated less light-sensitive film emulsions brings about displacement of the shutter speed scale to the left. On the other hand the displacement of member 6 which brings the external pointer means into alignment with the indicated more light-sensitive film emulsions brings about displacement of the shutter speed scale to the right.

To plot the scale of film speeds, that is to derive the locations of the graduations representing different film speeds, it is necessary to know the quantities of light that are required to give satisfactory image quality on film emulsions of different film speeds and these quantities expressed as multiples of the quantity of light necesary to give a satisfactory image quality on the film emulsion indicated at the datum.

These ratios may be derived from data supplied by manufacturers regarding the light source-to-subject distances which are required for various lighting sources to give satisfactory image quality upon their emulsions.

Suppose the subject of the photograph is illuminated in turn from three lighting sources A, B and C. Suppose further the respective light source-to-subject distances are $x_1$, $x_2$ and $x_3$ and that these distances are such the actinic strength of the lighting conditions upon the subject of the photograph is equal in the three situations. With a fixed proportion of this light required on a selected film emulsion it is obvious that only one value for $t/f^2$ is required in three situations. Suppose this value is satisfied with the paired values for the shutter speed and $f$/ratio ($t_1$, $f_1$). With A, B and C lighting sources of different actinic values, it follows from the inverse square law $A/x_1^2 = B/x_2^2 = C/x_3^2$. If $B = 2A$, and $C = 3A$ then $1/x_1^2 = 2/x_2^2 = 3/x_3^2$, say $Q_1$.

Next suppose the respective light source-to-subject distances using identical lighting sources A, B and C which give a satisfactory image quality on a second emulsion are $y_1$, $y_2$, and $y_3$, but making the restriction that the same paired values for the shutter speed and $f$/ratio as used previously are used in the second situation, namely ($t_1$, $f_1$).

From the inverse square law it follows $A/y_1^2 = B/y_2^2 = C/y_3^2$. If $B = 2A$ and $C = 3A$ then $1/y_1^2 = 2/y_2^2 = 3/y_3^2$, say $Q_2$.

With this data known for the film emulsion indicated at the datum, say $Q_1$ and for other film emulsions, say $Q_2$, $Q_3$, $Q_4$ . . . then the ratios of these quantities namely $Q_1/Q_2$, $Q_1/Q_3$, $Q_1/Q_4$ . . . can be computed. These numerical values give the quantity of light required for the different film emulsions expressed as multiples of the quantity of light required to produce a satisfactory image quality on the film emulsion indicated at the datum.

When this type of data is known for other camera settings, say ($t_2$, $f_2$) each set provides an independent estimate of the ratios. Mean values for these calculated ratios when plotted against their respective film speeds enables unknown values for the ratio for other film speed values to be obtained by interpolation.

On the invention the film speed scale is conveniently placed on member 6 immediately below the free end 5 of the laterally swingable arm 3, and the external pointer means as mentioned above is the central pointer line 29.

The free-end 5 of arm 3 has graduations 27, 28 on either side of the central pointer line 29, which with the central pointer line 29 cooperate with the film speed scale. This scale on the free end 5 of arm 3 permits corrections to film speed values when changes in the type or method of processing, which effect the film speed, are contemplated. The width of the arm 3, the film speed of the film emulsion indicated at the datum, and location of the datum in relation to indicated values on the shutter speed scale determine the degree of correction which can be accommodated by this correction scale on the free end of 5 of arm 3.

Notice that the film speed scale can be moved relative to the said correction scale and that one selected value on the film speed scale can cooperate with graduations on either side of the central pointer line 29, as well as the central pointer line 29 itself. This movement brings the displacement of the shutter speed scale to the right and to the left by a certain amount which as stated previously changes the numerical value for $t/f^2$. The film speed scale on member 6 and the said correction scale on the free end 5 of arm 3 are at the same radius from the pivot point. The $f$/ratio scale and the shutter speed scale on the arc on the upper edge 10 of member 9 and on the lower edge of member 6 respectively are on a common radius from the pivot point but different from the former. This change in radii has to be considered where the shutter speed scale has to be displaced a set distance by adjusting settings on the film speed scale.

In artificial light photography, lighting sources of different actinic values may be employed. Suppose the subject of the photograph is illuminated in turn from two sources of unequal actinic value A and B. It is possible to obtain one level for the actinic strength of the lighting conditions by bringing the lighting source with the smaller actinic value nearer the subject than the lighting source with the higher actinic value. The actual distances can be complted knowing the actinic values of the two lighting sources.

Suppose Q is the quantity of light which obtains a satisfactory image upon a film emulsion whose film speed value and processing correction value are indicated on the appropriate scales of the invention. Suppose further this quantity of light is obtained by any of the paired values as indicated on the shutter speed and $f$/ratio scales of the invention. In the above example where the subject of the photography is illuminated in turn from two sources of unequal actinic value, Q must remain constant. If the lighting source having an actinic value A units is placed at a distance $x_A$ from the subject gives the satisfactory image then the second lighting source with an actinic value B units would have to be placed at a distance $x_B$ from the subject such that $A/x_A^2 = B/x_B^2$. By placing a chart underneath the arm 3 and a scale along the longitudinal edge of the arm indicating light source-to-subject distances, the scaled distances $x_A$ and $x_B$ could be read off the light source-to-subject distance scale, and the two points plotted on the chart, and if necessary indicated as lighting sources A and B.

An increase in the actinic strength of the lighting conditions upon the subject of the photograph introduced by the reduction of the light source-to-subject distance requires less exposure. If the shutter speed is held constant then this reduction of exposure is achieved by smaller openings of the lens diaphragm, i. e. larger $f$/ratios.

For a lighting source with an actinic value A units, the actinic strength of the lighting conditions when light source-to-subject distance is $x$ is equal to $A/x^2$. The opening of the lens diaphragm must increase as $A/x^2$ decreases and vice versa. The area of the opening of the lens diaphragm varies directly as the square of the diameter, that is indirectly as the square of the $f$/ratio so that the actinic strength of the lighting conditions $A/x^2$ varies indirectly as $1/f^2$, or directly as $f^2$. Thus for a lighting source with an actinic value A units the change in the $f$/ratio to compensate for the change in the light source-to-subject distances is given by the relationship $f^2 x^2$ must remain constant, or likewise $fx$ is constant. Suppose for a lighting source A this constant is $k_A$.

Suppose $x_A$ is known for a lighting source A which requires the $f$/ratio $f_{x_A}$ at a certain shutter speed in order to produce a satisfactory image quality upon the film emulsion whose film speed value and processing correction value as indicated on the scales of the device. It has been shown that a change in the light source-to-subject distance, other things being equal, requires a change in the $f$/ratio such that the relationship $fx = k_A$ is maintained. With $x_A$ and $f_{x_A}$ known for the lighting source A then the value $k_A$ is also known being the product of $x_A$ and $f_{x_A}$. Thus, other things being equal the light source-to-subject distances for any selected $f$/ratio can be computed by dividing $k_A$ by the selected $f$/ratio value. It is to be understood the computations can be repeated for lighting source B and for other lighting sources known to the photographic art. Since the light source-to-subject distances in the literature are quoted at best to the nearest three inches, it follows the product term $fx$ would not be constant. It is suggested that several estimates of this constant be obtained from data given in the literature and to compute their average for the calibration.

Photographic literature gives in tabular form, light source-to-subject distances for various lighting sources which obtain satisfactory image quality upon film emulsions for selected $f$/ratio and shutter speed settings. These values could be plotted on the chart 11 in the same way as $x_A$ and $x_B$, then the points representing one lighting source joined up as a smooth curve.

It must be realized that the dimensions of the integers and the selected range of the factors to be scaled on the invention determine the pattern of the curves on the chart. The form of the invention is also important in this regard. One form of the invention allows for corrections to be applied to the actinic strengths of the lighting conditions. This requires the light source-to-subject distances to be plotted logarithmically rather than linearly which has the effect of changing the appearance of the curves although the dimensions of the integers and the selected range of the factors remain unaltered.

A more satisfactory method to obtain the curves is by means of the following geometric construction. It is assumed the width of the arm 3, the radius of the upper edge 10 of the fixed member 9, the location of the light source-to-subject distance scale on the arm 3, the form of the invention whether the light source-to-subject distance scale is logarithmic or linear, are known. A scaled drawing is made of the invention with the arm 3 placed at different positions across the arc. The center line of the arm on this drawing is produced and the positions of the arm are chosen so that this center line passes through the different f/ratio indicated values plotted along the upper edge 10 of the fixed member 9 in the scaled drawing. This construction is equivalent to lining up a film speed value with the central pointer line 29 and swinging the arm 3 and member 6 as a unit and moving the constant shutter speed value which falls on the same radius from the central pivot as the said film speed value through the range of f/ratio values on the invention. At the selected positions of the arm 3 the different distances for a selected lighting source are plotted and then joined up with a smooth curve. The process is repeated for other lighting sources known to the photographic art. It is not difficult to obtain mathematical equations to express this geometric construction in general terms, i. e. symbols used for the dimensions of the invention. The geometric construction method is simpler and if the scaled drawing is made on a large scale and subsequently reduced to the required dimensions of the invention the accuracy obtained is quite satisfactory.

It is now proposed to discuss the form of the invention which allows for corrections to be applied to the actinic strengths of the lighting conditions. This form requires a longitudinally slidable member 15 on the arm 3.

If the lighting source with an actinic value A units is placed at a distance $x_1$ from the subject then the actinic strength of the lighting conditions on the subject is $A/x_1^2$. If the actinic strength were reduced by half then this is equivalent to increasing the light source-to-subject distance to $x_2$ with the same lighting source A such that $A/x_2^2 = \frac{1}{2} A/x_1^2$, or $\log x_2 - \log x_1 = \frac{1}{2} \log 2$. Likewise if the actinic strength were reduced by one-third then this is equivalent of increasing the light source-to-subject distance $x_3$ with the same lighting source A such that $A/x_2^2 =$ one-third $A/x_3^2$ or $\log x_3 - \log x_1 = \frac{1}{2} \log 3$.

Thus a reduction in the actinic strength from say Q to $Q/n$ with the same lighting source requires $\frac{1}{2} \log n$ to be added to $\log x_1$, where $x_1$ is the light source-to-subject distance prior to the reduction.

By plotting a logarithmic scale for the light source-to-subject distances on the longitudinally slidable member 15 to cooperate with the curves 12 on chart 11 and by plotting a half-log scale also on the longitudinally slidable member 15 to cooperate with a datum line drawn on the arm 3 provides a convenient means of handling corrections to the actinic strength of the lighting conditions. Increments in the half-log scale are added or subtracted to $\log x_1$ and indicated values on this half-log scale are the factors by which the actinic strengths of the lighting conditions are multiplied or divided.

More than one datum may be drawn on the arm with which the half-log scale on the longitudinally slidable member 15 may be made to cooperate. If instead of the single datum line drawn on the arm 3 a second half-log scale is drawn with this second half-log scale the mirror image of the first then two scales provide for multiplying factors and dividing factors to be indicated on the invention. With the single datum on the arm 3 the corrections would be restricted to either multiplying factors or dividing factors.

The degree of correction which is possible on these scales is dependent on the dimensions of the longitudinally slidable member 15, the selected range of the light source-to-subject distances and the selected length of this scale. For example, if the light source-to-subject distance scale ranges from say 2 to 16 feet, and the movement of the longitudinally slidable member 15 is restricted to one quarter of the length of this scale then the degree of correction possible to any light source-to-subject distance would be to alter $x$ to $x/2$. This is equivalent to increasing the actinic strength of the lighting conditions fourfold or alternatively, permitting the reduction by one-half and a two-fold increase to the actinic strength indicated by the longitudinally slidable member in its central position. On the arm 3, two datum lines rather than a half-log scale may be drawn. One could represent the original datum, i. e. no secondary correction and the second the reduction in the actinic strength required with cameras having coated lens systems to compensate for their increased light transmission over uncoated lens systems. Other indicated corrections could be placed on these scales, the two described are given as an illustration.

It is to be understood that the description of the plotting of the curves and scales which are concerned with one situation is highly restrictive. It is unlikely that the quantitive relationships between the various factors concerned in any selected situation will correspond, in their entirety, with those of a new situation. One skilled in the art should have no difficulty in adopting a similar approach to that herein described and apply this to any new situation not necessarily concerned with the photographic art. The basic requirement is that the quantitive relationships between the factors, the selected range of the factors and the dimensions of the integers of the invention should be known.

My device enables such factors as the actinic strengths and the lighting conditions, corrections to the actinic strengths required in special circumstances, the sensitivities of light-sensitive materials, corrections to the sensitivity values required in special circumstances, and camera exposure settings to be co-ordinated, combined, and indicated to give all necessary details and adjustments for effective exposure determinations. Further, any unknown value can be obtained readily by adjusting the device to the known factors.

It is to be understood that the general method of my device could have a variety of practical applications and not be restricted to exposure determinations. My method co-ordinates and combines eight variables which are related to each other for a final determination, and my method gives almost immediately the unknown factors when known factors have been referenced on the device.

I claim:

1. A computing device comprising, in combination, a base plate; a chart plate secured to said base plate; a manually operated arm pivoted at one end thereof to said base plate; a member fixed on said base plate beyond the free end of said arm; and a manually operable laterally slidable part-annular member positioned between said free end of said arm and said fixed member.

2. A computing device as set forth in claim 1 in which said base plate, said arms, and said part-annular member and said chart plate are provided, respectively, with indicia representing measured quantities relating to the photographic art.

3. A computing device as set forth in claim 1 in which said base plate, said arm, and said part-annular member and said chart plate are provided, respectively, with indicia representing measured quantities relating, respectively, to different actinic values of light sources, to distances between a source of light and an illuminated subject, to film speeds, and to lens apertures, to shutter speeds, and to increases and reductions in film speeds.

4. A computing device comprising, in combination, a base plate having a set of indicia in the form of graphs arranged thereon; a manually operated arm pivoted at one end thereof to said base plate and having graduations arranged thereon, said graduations moving over and cooperating with said graphs during pivotal movement of said arm; an arcuate member attached to the free end of said arm movable with the same and bearing a scale; and arcuate scale means on said base plate and cooperating with said scale on said arcuate member.

5. An exposure computing device comprising, in combination, a base plate having a set of indicia in the form of graphs arranged thereon, said graphs representing the actinic values of various light sources; a manually operated arm pivoted at one end thereof to said base plate and having graduations arranged thereon, said graduations representing distances between a source of light and an illuminated object, said graduations moving over and cooperating with said graphs during pivotal movement of said arm; an arcuate member attached to the free end of said arm movable with the same and bearing a scale; and arcuate scale means on said base plate and cooperating with said scale on said arcuate member, said scale means and said scale on said arcuate member adapted to represent shutter speeds and lens aperture values.

6. A computing device comprising, in combination, a base plate having a set of indicia in the form of graphs arranged thereon; a manually operated arm pivoted at one end thereof to said base plate and having graduations arranged thereon, said graduations moving over and cooperating with said graphs during pivotal movement of said arm, said arm having on the free end thereof indicia; a scale member having a part-circular edge and bearing a first scale on said edge, and a second scale; connecting means adjustably connecting said scale member to said free end of said arm for transverse movement during which said second scale moves relative to said indicia on said free end of said arm; and arcuate scale means on said base plate cooperating with said first scale on said scale member.

7. An exposure computing device comprising, in combination, a base plate having a set of indicia in the form of graphs arranged thereon, said graphs representing the actinic values of various light sources; a manually operated arm pivoted at one end thereof to said base plate and having graduations arranged thereon, said graduations moving over and cooperating with said graphs during pivotal movement of said arm, said graduations representing distances between a source of light and an illuminated object, said arm having on the free end thereof indicia; a scale member having a part-circular edge and bearing a first scale on said edge, and a second scale, said second scale adapted to represent the sensitivity of different film emulsions; connecting means adjustably connecting said scale member to said free end of said arm for transverse movement during which said second scale moves relative to said indicia on said free end of said arm; and arcuate scale means on said base plate cooperating with said first scale on said scale member, said scale means and said first scale adapted to represent shutter speeds and lens aperture values.

8. A computing device comprising, in combination, a base plate having a set of indicia in the form of graphs arranged thereon; a manually operated arm pivoted at one end thereof to said base plate and having graduations arranged thereon, said arm having on the free end thereof indicia; a graduated member slidably mounted on said arm for longitudinal movement, said graduated member having first graduations moving over and cooperating with said graphs during pivotal movement of said arm, and a second set of graduations cooperating with said graduations on said arm; a scale member having a part-circular edge and bearing a first scale on said edge, and a second scale; connecting means adjustably connecting said scale member to said free end of said arm for transverse movement during which said second scale moves relative to said indicia on said free end of said arm; and arcuate scale means on said base plate cooperating with said first scale on said scale member.

9. An exposure computing device comprising, in combination, a base plate having a set of indicia in the form of graphs arranged thereon, said graphs representing the actinic values of various light sources; a manually operated arm pivoted at one end thereof to said base plate and having graduations arranged thereon, said arm having on the free end thereof indicia; a graduated member slidably mounted on said arm for longitudinal movement, said graduated member having first graduations moving over and cooperating with said graphs during pivotal movement of said arm, said first graduations representing distances between a source of light and an illuminated object, and a second set of graduations cooperating with said graduations on said arm, said graduations on said arm and said second set of graduations on said graduated member being adapted to indicate required corrections of the values represented by said graphs; a scale member having a part-circular edge and bearing a first scale on said edge, and a second scale, said second scale adapted to represent the sensitivity of different film emulsions; connecting means adjustably connecting said scale member to said free end of said arm for transverse movement during which said second scale moves relative to said indicia on said free end of said arm; and arcuate scale means on said base plate cooperating with said first scale on said scale member, said scale means and said first scale adapted to represent shutter speeds and lens aperture values.

10. A computing device comprising, in combination, a base plate including a chart plate having a set of indicia in the form of graphs thereon; a manually operated arm pivoted at one end thereof to said base plate and having graduations arranged thereon, said arm having on the free end thereof indicia; a graduated member slidably mounted on said arm for longitudinal movement, said graduated member having first graduations moving over and cooperating with said graphs during pivotal movement of said arm, and a second set of graduations cooperating with said graduations on said arm; a scale member having a part-circular edge and bearing a first scale on said edge, and a second scale; connecting means adjustably connecting said scale member to said free end of said arm for transverse movement during which said second scale moves relative to said indicia on said free end of said arm; and arcuate scale means on said base plate cooperating with said first scale on said scale member.

11. A computing device as set forth in claim 10 wherein said arcuate scale means is fixed on said base plate and has a part-circular edge in engagement with said part-circular edge of said scale member and bearing a scale cooperating with said first scale on said scale member.

12. A computing device as set forth in claim 10 wherein said connecting means includes locking means for locking said scale member to said free end of said arm.

13. A computing device as set forth in claim 12 wherein said connecting means includes a threaded member and a nut, and wherein said scale member is formed with a slot receiving said threaded member.

14. A computing device as set forth in claim 10 and including means for locking said graduated member to said arm in a position determined by said second set of graduations.

15. A computing device as set forth in claim 14 wherein said graduated member is formed with a slot, and wherein said means for locking said graduated member include a threaded member passing through said slot and a locking nut for clamping said graduated member to said arm.

16. A computing device as set forth in claim 10 wherein said connecting means includes locking means for locking said scale member to said free end of said arm, and including means for locking said graduated member to said arm in a position determined by said second set of graduations.

17. An exposure computing device comprising, in combination, a base plate including a chart plate having a set of indicia in the form of graphs thereon, said graphs representing the actinic values of various light sources; a manually operated arm pivoted at one end thereof to said base plate and having graduations arranged thereon, said arm having on the free end thereof indicia; a graduated member slidably mounted on said arm for longitudinal movement, said graduated member having first graduations moving over and cooperating with said graphs during pivotal movement of said arm, said first graduations representing distances between a source of light and an illuminated object, and a second set of graduations cooperating with said graduations on said arm, said graduations on said arm and said second set of graduations on said graduated member being adapted to indicate required corrections of the values represented by said graphs; a scale member having a part-circular edge and bearing a first scale on said edge, and a second scale, said second scale adapted to represent the sensitivity of different film emulsions; connecting means adjustably connecting said scale member to said free end of said arm for transverse movement during which said second scale moves relative to said indicia on said free end of said arm; and arcuate scale means on said base plate having a part-circular edge bearing a scale cooperating with said first scale on said scale member, said scale means and said first scale adapted to represent shutter speeds and lens aperture values.

18. An exposure computing device as set forth in claim 17 wherein said connecting means includes locking means for locking said scale member to said free end of said arm, and including means for locking said graduated member to said arm in a position determined by said second set of graduations.

References Cited in the file of this patent

UNITED STATES PATENTS

| 1,144,142 | Lupton | June 22, 1915 |
| 1,195,702 | MacMillan | Aug. 22, 1916 |
| 2,436,966 | Legris | Mar. 2, 1948 |
| 2,437,774 | Wilcox | Mar. 16, 1948 |
| 2,532,892 | Clark | Dec. 5, 1950 |